United States Patent [19]

Ichikawa et al.

[11] 4,436,318
[45] Mar. 13, 1984

[54] VEHICLE LEVEL DETECTOR WITH FAIL-SAFE MECHANISM

[75] Inventors: Mamoru Ichikawa, Atsugi; Sachio Satake, Yokohama, both of Japan

[73] Assignees: Nissan Motor Company, Limited, Yokohama; Atsugi Motor Parts Company Limited, Atsugi, both of Japan

[21] Appl. No.: 283,795

[22] Filed: Jul. 16, 1981

[30] Foreign Application Priority Data

Sep. 27, 1980 [JP] Japan .................................. 55-134645

[51] Int. Cl.³ ................................................ B60G 3/14
[52] U.S. Cl. ..................................... 280/104; 280/707; 280/714
[58] Field of Search ........................ 280/104, 707, 714

[56] References Cited

FOREIGN PATENT DOCUMENTS 1360990 7/1974 United Kingdom ................. 280/104
1450696 9/1976 United Kingdom ................. 280/104

Primary Examiner—Richard A. Bertsch
Attorney, Agent, or Firm—Lane, Aitken & Kananen

[57] ABSTRACT

A vehicle level detector has a pair of switching elements respectively secured to a vehicle body and a suspension member for displacement with respect to one another corresponding to the displacement of the vehicle body and the suspension member. The switching elements are arranged to detect relative distance between the vehicle body and the suspension member and to produce signals when the detected distance is smaller or greater than predetermined minimum or maximum values. A fail-safe mechanism is provided to urge one of the switching elements to a position normally placing the switching element in relation to the other switching element such that the relative distance between the vehicle body and the suspension member is maintained within a range between the minimum and maximum predetermined values.

20 Claims, 10 Drawing Figures

VEHICLE LEVEL DETECTOR WITH FAIL-SAFE MECHANISM

BACKGROUND OF THE INVENTION

The present invention relates generally to a vehicle level detector which detects a change in the level of a vehicle as reflected in a varying relative distance between a suspension member and the lower surface of a vehicle body or carrosserie. More specifically, the invention relates to a vehicle level detector including a fail-safe mechanism which prevents the vehicle level detector from failure in operation even when one of the elements constituting the detector is damaged.

During the running of a vehicle, it is necessary to make a correction for any abnormal variation in the elevation of a vehicle body which exceeds a normal range of elevation change. A conventional detector comprises a reed switch which detects a change in the relative distance between a suspension member and the lower surface of the vehicle body. While the reed switch is arranged to be switched on and off in accordance with a varying elevation of the vehicle body to thereby detect such variation, the switching of the reed switch which is frequently repeated as the vehicle body moves up and down causes an increased amount of wear of a movable switch contact, giving rise to a poor electrical contact. This also degrades the durability, and hence such a switch cannot be used over a prolonged period of time.

In the meanwhile, the vehicle level detector is normally secured on the vehicle body and is connected to the suspension member with a link mechanism for detecting the relative positions of the vehicle body and the suspension member. Since the link mechanism is subject to road shock and so on with the vehicle body and the suspension member, it is liable to be damaged. When the link mechanism is damaged, the vehicle level detector tends to fail in operation to place the vehicle in an unstable condition.

SUMMARY OF THE INVENTION

The invention contemplates the elimination of above disadvantage of a conventional vehicle level detector by avoiding the use of a switching member such as a reed switch which depends on mechanical contacts for its operation, and by instead employing a contact-free switching element.

Therefore, it is an object of the invention to provide a vehicle level detector which has improved durability by using a contact-free switching element and fail-safe mechanism for preventing the detector from failure of operation.

It is a specific object of the invention to provide a vehicle level detector in which a switching element is formed by a magnetoelectric transducer element and a multi-pole magnet and in which the fail-safe mechanism maintains the switching element at a neutral position when one of elements of the detector is damaged.

To accomplish the above-mentioned and other objects, a vehicle level detector, according to the present invention, has a pair of switching elements respectively secured to a vehicle body and a suspension member for displacement with respect to one another corresponding to the displacement of the vehicle body and the suspension member. The switching elements are arranged to detect a relative distance between the vehicle body and the suspension member and to produce signals when the detected distance is smaller or greater than predetermined minimum or maximum values. A fail-safe mechanism is provided to urge one of the switching elements to a position normally placing the switching element in relation to the other switching element such that the relative distance between the vehicle body and the suspension member is maintained within a range between the minimum and maximum predetermined values.

In accordance with the present invention, there is provided a vehicle level detector comprising a detector housing secured onto a vehicle body for motion therewith, a stationary transducer element, such as a magnetoelectric transducer element, secured within the detector housing, a movable transducer element such as a magnet disposed within the detector housing in an opposing relationship with respect to the stationary transducer, the movable transducer cooperatively producing first and second signals respectively indicative of an excessively lowered and raised position of the vehicle body with respect to a vehicle suspension member, a link mechanism connecting the movable transducer element and operating the movable transducer among a first position where a transducer elements produces the first signal, the second position where the transducer elements produces the second signal and a third position where the transducer is in an inoperative position, and a biasing means for biasing the movable transducer element to the third position.

Preferably, one of the stationary transducer element and the movable transducer element is mounted on the vehicle body while the other element is connected with the suspension member.

The magnetoelectric transducer element may comprise a Hall element, which may be formed as an integrated circuit element. The transducer elements are fixedly mounted on a vehicle body with a given spacing therebetween which defines a dead zone corresponding to a normal range of variation of the elevation. Where the magnet is movable, the range of its movement is limited by stops. In another aspect of the invention, an actuating member is provided which includes means for temporarily maintaining the magnet in its displaced position whenever a displacement of the magnet is detected which indicates that the elevation of the vehicle body exceeds a normal range of elevation.

With the present invention, the use of a contact-free magnetoelectric transducer element enables its switching to be repeated as many times as desired and avoids any degradation in its operation over a prolonged period of use, thus providing an economical vehicle level detector having an improved durability.

The above and other objects, features and advantages of the invention will be apparent from the hereinafter illustrated preferred embodiments of the invention.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all provided purely for the purposes of illustration and exemplification, and are in no way to be taken as limitative of the scope of the present invention. In the drawings.

DESCRIPTION OF THE PREFERRED EMBODIMENT

Figure 1:
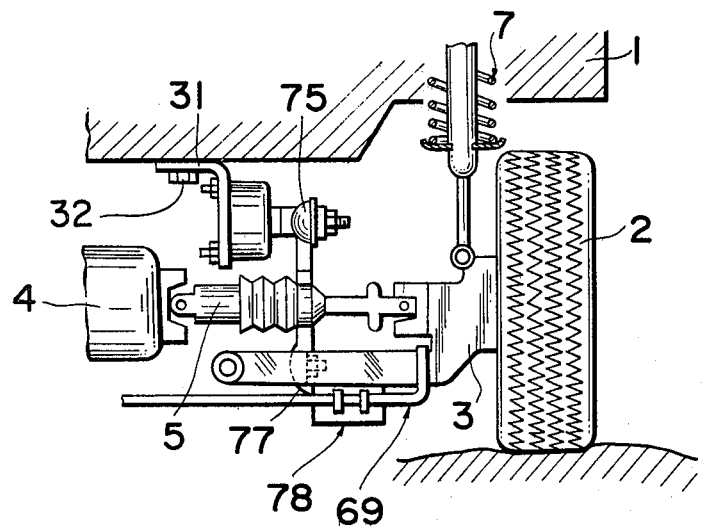
FIG. 1 is a schematic fragmentary front elevation of a vehicle level detector in accordance with the preferred embodiment of the invention.
Figure 2:
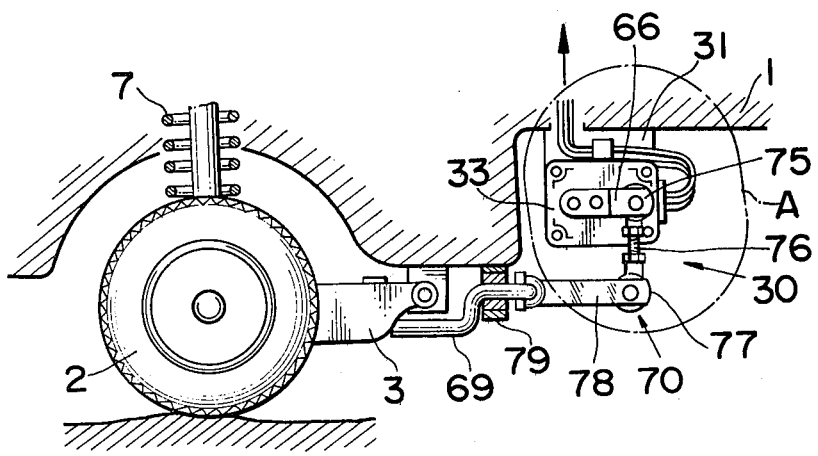
FIG. 2 is a side elevational view of the detector of FIG. 1.
Figure 3:
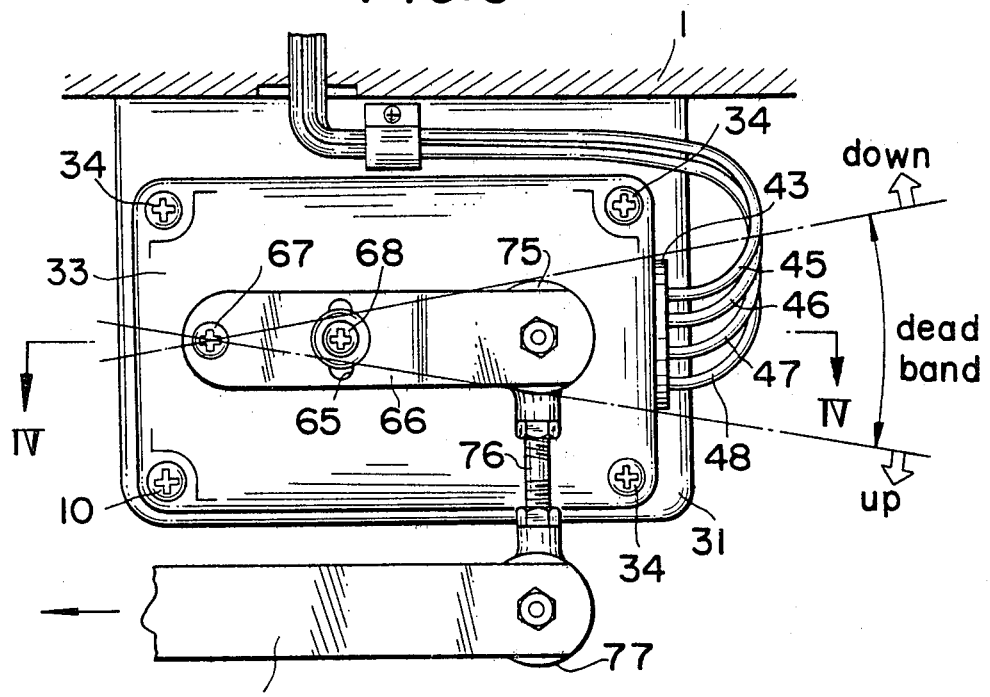
FIG. 3 is a fragmentary enlarged view of a portion encircled A of FIG. 2.
Figure 4:
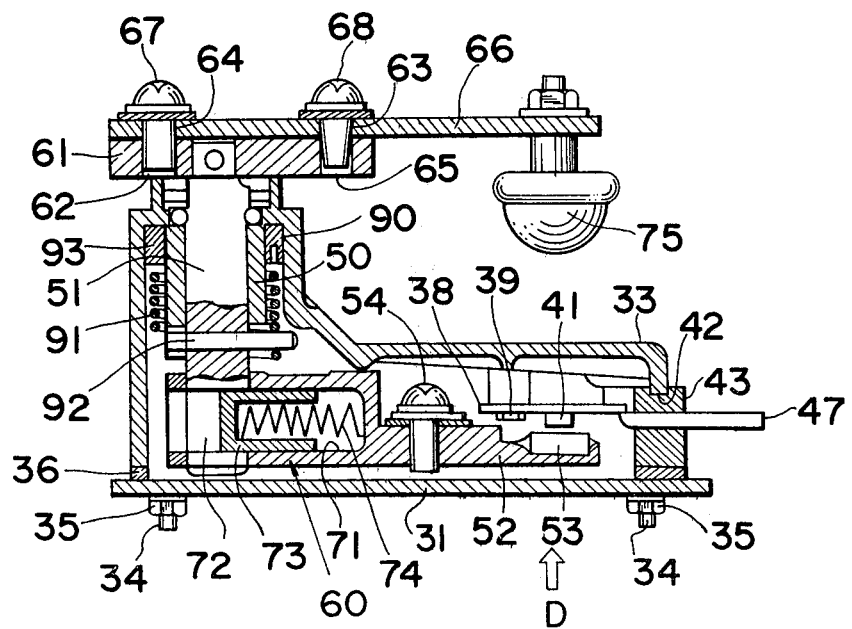
FIG. 4 is a cross sectional view taken along line IV—IV of FIG. 3.

Referring to FIGS. 1 and 2, there is shown a preferred embodiment of a vehicle level detector according to the present invention, which is mounted on a vehicle body 1. A wheel 2 is rotatably mounted on a trailing arm 3. A differential unit 4 is connected to the wheel 2 via a drive shaft 5 to transmit thereto an engine output. The vehicle body 1 is suspended above the trailing arm 3 with a suspension 7 including a shock absorber and a suspension spring. A vehicle level detector 30 of this embodiment includes a bracket 31 in the form of a L-shaped plate, serving as a stationary member, which is secured onto the vehicle body 1 by bolts 32. As can be seen best from FIGS. 3 and 4, a box-shaped cover 33 is secured to the bracket 31 by a plurality of bolts 34 and nuts 35 with a gasket 36 interposed therebetween. A mounting plate 38 is fixedly connected with the top wall of the cover 33 by means of two set screws 39, and a pair of magnetoelectrical transducer elements or Hall elements 40, 41 are fixedly mounted on the mounting plate 38. The Hall elements may be formed by integrated circuit elements. In one side thereof, the cover 33 is formed with a notch 42 in which is fitted a grommet 43. A plurality of lead wires 45, 46, 47, 48 extend through the grommet 43 and each has one end connected with the Hall elements 40, 41. The top wall of the cover 33 is formed with an opening contiguous with an axial sleeve 50 which receives a shaft 51. An arm 52 is rotatably mounted on the inner end of the shaft 51, and a magnet 53 having two poles is secured on the free end of the arm 52 in vertical alignment with the Hall elements 40, 41. As can be seen from FIG. 5, intermediate its length, the arm 52 is provided with two stops 55 (FIGS. 5 and 10) secured thereto by a set screw 54 and which is adapted to bear against abutment surfaces 56 formed on the cover 33, thereby limiting the angle through which the arm 52 is movable. There is provided a rotary mechanism 60 which permits a rotation of the shaft 51, if a rotation of the arm 52 is prevented by one side of the stops 55. A mounting member 61 is secured to the top end of the shaft 51 for integral rotation therewith. Towards its opposite ends, the mounting member 61 is formed with threaded bores 62, 65, and an arm 66 is clamped to the mounting member 61 by passing bolts 67, 68 through a circular opening 64 and an elongated slot 63 formed therein and threadably engaging them with the threaded bores 62, 65. A linkage 70 (FIG. 2) is mounted on a stabilizer 69 which has its one end mounted on the free end of the arm 66 and its other end secured to the trailing arm 3. As is shown in FIG. 4, a fail-safe mechanism 90 is provided at the longitudinally intermediate portion of the shaft 51. The fail-safe mechanism 90 comprises a torsion spring 91 wound around the shaft 51, a pin 92 passing through the shaft 51 and engaging with the lower end of the spring 91 and a spring seat 93 connecting the upper end of the spring to the cover 33. The torsion spring 91 normally biases the shaft 51 in the circumferential direction, so that it may resist rotational force applied to the shaft due to the gravity of the arm 66 and the linkage 70 when one of the elements cooperatively connecting the arm 52 with the stabilizer 69 such as the linkage 70, bolts 67 and 68 or a pin 92 connecting the shaft 51 with the mounting member 61 is damaged. Thus, the torsion spring 91 maintains the magnet 53 in the dead band or the exhaust signal band of the detector when the arm 52 is accidentally disconnected from the stabilizer 69. The rotary mechanism 60 comprises a cylinder 71 formed on the arm 52, a semi-circular cut-out 72 formed in a portion of the shaft 51 which extends through the cylinder 71, a piston 73 received in the notch 72 for sliding movement within the cylinder 71, and a spring 74 which normally urges the piston 73 towards the shaft 51. The linkage 70 comprises a ball joint 75 which is rotatably mounted on the arm 66, a link 76 having its one end threadably engaged with the ball joint 75 and its other end threadably engaged with another ball joint 77, and another link 78 having one end on which the ball joint 75 is rotatably mounted and another end which is fixedly connected with the stabilizer 69. It is to be noted that the stabilizer 69 is mounted on the vehicle body 1 with a rubber bushing 79 interposed therebetween.

Figure 6:
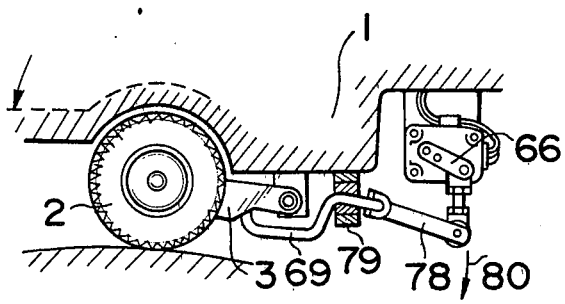
FIGS. 6 and 7 are views similar to FIG. 2, showing different operative conditions.
Figure 7:
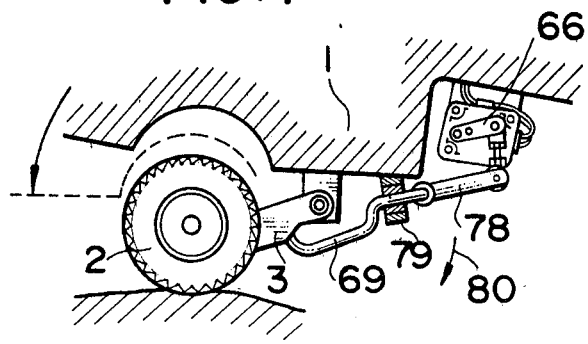

In operation, when the elevation of the vehicle body is reduced relative to the trailing arm 3 as shown in FIG. 6, the stabilizer 69 and the link 78 angularly move about the rubber bushing 79, which defines a fulcrum, in a direction indicated by an arrow 80. This causes the arm 52 to be rotated in the same direction through the ball joint 76, link 77, ball joint 75, arm 66 and shaft 51. Such rotation of the arm 52 is effective to angularly move the magnet 53 in the same direction, thereby activating or turning the Hall elements 40, 41 on. Consequently, after a given time interval, these elements produce a suction signal which is transmitted to a hydropneumatic device. When the elevation of the vehicle body increases relative to the trailing arm 3 as shown in FIG. 7, the stabilizer 69 and the link 78 rotate about the rubber bushing 79 in the direction opposite from that indicated by the arrow 80. This motion is transmitted through the ball joint 75, link 78, ball joint 76, arm 66, shaft 51 and the arm 52 to cause a rotation of the arm 52 in the same direction. Consequently, the Hall magnet 53 rotates in the same direction for deactivating or turning the elements 40, 41 off. Thus, after a given time interval, the elements produce an exhaust signal which is transmitted to the hydropneumatic device.

When the elevation of the vehicle body is in a normal range or in its dead band, the Hal element 40 is located opposite to the S-pole of the magnet 53 to be deactivated, while the element 41 is located opposite to the N-pole thereof to be activated.

Figure 8:
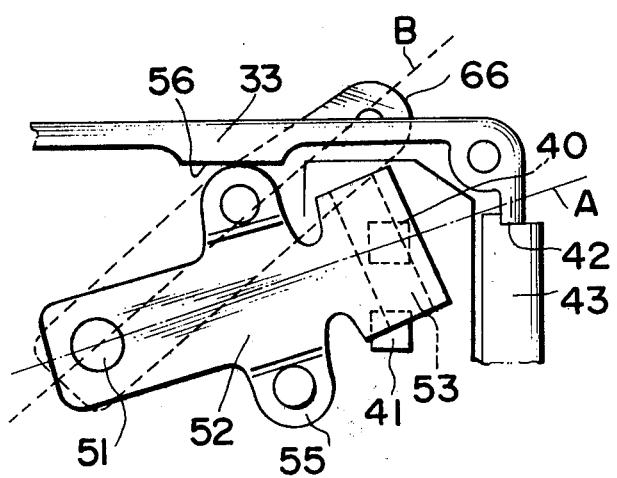
FIG. 8 is a partial illustration, showing the positional relationship of arms of FIG. 5.

When the elevation of the vehicle body varies greatly to exceed the dead band, the rotary mechanism 60 absorbs an overstroke of the arm 52 to maintain the arm 52 which carries the magnet 53 in a position where the one of the stops 55 bears against the corresponding abutment surface 56. After a given time interval, the Hall elements 40 and 41 produce either a suction or an exhaust signal to be transmitted to the hydropneumatic device. In this manner, the cover 33 can be minimized in size. When the vehicle body 1 returns to its normal position after having been raised or lowered, the rotary mechanism 60 maintains the arm 52 in position until the centerline B of the arm 66 coincides with the centerline A of the arm 52 as shown in FIG. 8, continuing to produce either suction or exhaust signal. The suction or exhaust signal is interrupted at the moment when the boundary between the S- and N-poles of the magnet 53 mounted on the arm 52 passes over the elements 40, 41. The operation of the Hall elements 40, 41 is summarized in the table B below.

(TABLE B)

| Elevation | Element 40 | Element 41 |
| --- | --- | --- |
| lower elevation | on | on |
| normal range | off | on |
| higher elevation | off | off |

The normal position of the vehicle body can be adjusted by changing the length of the link 78 between the ball joints 75, 76, or by loosening the bolts 67, 68 to establish a given angle between the centerline A of the arm 52 and the centerline B of the arm 66.

Here, if one of the elements connecting the arm 52 to the stabilizer 69 is accidentally damaged and, the connection is therefore broken, the gravity of the elements connected with the arm 52 acts to rotate the arm downwardly. Against this rotational force, the spring force provided by the torsion spring 91 is applied to the shaft 51 for preventing the shaft 51 and the arm 52 from rotating. Thus, the magnet 53 is maintained within the dead band or the exhaust signal band of the detector to ensure the safety of detector and, in turn, the safety of vehicle level regulation system.

From the foregoing description, it will be apreciated that the use of a magnetoelectric transducer element such as Hall elements provides a useful life of the detector which is virtually unlimited, thus achieving a substantial improvement over the use of the reed switch. The use of an angularly movable arm facilitates an adjustment of the normal position of the vehicle body. Finally, the provision of the rotary mechanism between the arm and the linkage permits the extent of rotation of the arm to be limited, thus permitting the use of a magnet and hence a sensor of a smaller size.

Although the present invention has been described hereinabove with reference to the accompanying drawings which show the specific embodiment of the invenion, the invention should not be understood as limitative to the foregoing embodiment and can be embodied otherwise in any suitable manner. For example, FIGS. 9 and 10 respectively show modifications of the foregoing embodiment.

Figure 9:
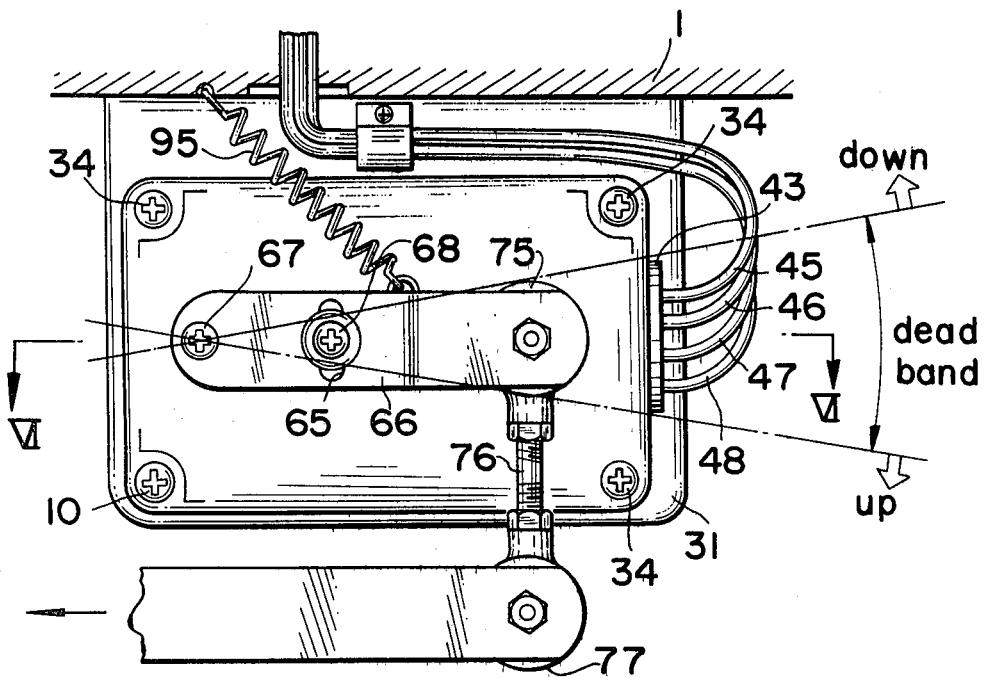
FIG. 9 is a similar view to FIG. 3 but showing a modification of the fail-safe mechanism in the vehicle level detector of the preferred embodiment.

In the modification of FIG. 9, the fail-safe mechanism for the detector comprises a compression spring 95 which is provided to bias the arm 66 upwardly. The upper end of the spring 95 is secured onto the vehicle body 1 or the bracket 31 and the lower end is connected with the arm 66. On the other hand, in the modification of FIG. 10, the fail-safe mechanism comprises a tension spring 96 disposed between the arm 52 and the cover 33. The upper end of the spring 96 is connected with the arm 52 and the lower end is connected with the cover 33.

What is claimed is:
1. A vehicle level detector comprising:
 a detector housing secured onto a vehicle body for motion therewith;
 a stationary transducer element secured with said detector housing;
 a movable transducer element disposed within said detector housing in an opposing relationship with respect to said stationary transducer element, said movable transducer element cooperatively producing a first signal indicative of the vehicle body elevation relative to a vehicle suspension member lowered across a first predetermined value and a second signal indicative of the vehicle body elevation relative to said vehicle suspension member raised across a second predetermined; value
 a link mechanism connected to said movable transducer element and operating said movable transducer element among the first position where said transducer elements produce said first signal, the second position where said transducer elements produce said second signal and the third position where said transducer elements are in an inoperative position; and
 a resilient means associated with said movable transducer element for resiliently positioning said movable transducer element to said third position.

2. A detector as set forth in claim 1, wherein said stationary transducer element is an electromagnetic transducer and said movable transducer element includes magnets respectively having different poles, which magnets are positioned in a spaced apart relationship.

3. A detector as set forth in claim 1 or 2, wherein said movable transducer element is pivoted in said detector housing so that it can rotate thereabout among said first, second and said third positions corresponding to a relative position of the vehicle and the suspension member.

4. A detector as set forth in claim 3, wherein said resilient means is a torsion spring, one end of which is connected with the detector housing and the other end of which is connected with said movable transducer element.

5. A detector as set forth in claim 3, wherein said resilient means is a tension spring, one end of which is connected with the detector housing and the other end of which is connected with the movable transducer element.

6. A detector as set forth in claim 3, wherein said resilient means is a compression spring, one end of which is connected with the detector housing and the other end of which is connected with the movable transducer element.

7. A detector as set forth in claim 3, wherein said stationary element is a Hall element.

8. A vehicle level detector for detecting relative displacement of a vehicle body and a vehicle wheel, comprising:
 a pair of transducer elements fixedly secured on one of said vehicle body and a vehicle wheel suspension member and being positioned in a spaced apart relationship with respect to each other to define therebetween a dead band of the detector;
 a movable transducer element opposed to said stationary transducer elements and being movable in response to the relative displacement of the vehicle body and the vehicle wheel suspension member, which movable member moves to a first position to produce a first detector signal when a dimension between the vehicle body and the vehicle wheel becomes smaller than that of a first predetermined value and to a second position to produce a second detector signal when the dimension between the vehicle body and the vehicle wheel becomes larger than a second predetermined value, and a third position in which the movable transducer being in said dead band of the stationary transducer elements does not produce a detector signal;

a linkage connecting the other of said vehicle body and the vehicle wheel suspension member to said movable transducer element to move the movable transducer element according to relative displacement of the vehicle body and the vehicle wheel suspension member; and fail-safe means associated with said movable transducer element for urging said movable transducer element under a no load condition to a position other than said first position;

whereby said fail-safe means prevents the detector from malfunctioning even when said linkage is damaged to cause the movable transducer element movement irrespective to the displacement of the vehicle body and the vehicle wheel suspension member.

9. A detector as set forth in claim 8, wherein said fail-safe means comprises a coil spring wound on a rotatable shaft on which said movable transducer element is fixedly secured, which rotatable shaft is connected to said linkage for rotation in response to the relative motion of the vehicle body and the vehicle wheel suspension member.

10. A detector as set forth in claim 8, wherein said fail-safe means is a tension spring urging said movable transducer element to said third position.

11. A detector as set forth in claim 8, wherein said fail-safe means is a tension spring urging said movable transducer element to said second position.

12. A detector as set forth in claim 8, 9, 10 or 11, wherein said stationary transducer elements and said movable transducer element are received in a detector housing fixed onto the vehicle body, and said stationary transducer elements are fixed onto the periphery of said detector housing.

13. A detector as set forth in any one of the preceeding claims 8 to 11, wherein said linkage connects said movable transducer element to a suspension link in order to move said movable transducer element according to the relative motion of the suspension link with respect to the vehicle body.

14. A vehicle level detector for detecting relative displacement between a vehicle body and a vehicle suspension member, comprising:
a detector housing secured onto said vehicle body for motion therewith;
a stationary transducer element secured with said detector housing;
a movable transducer element disposed within said detector housing in an opposing relationship with respect to said stationary transducer element, said movable transducer element cooperatively detecting a vehicle body level relative to said vehicle suspension member lowering across a first predetermined value to produce a first signal, raising across a second predetermined value to produce a second signal, and being in a range between said first and second predetermined values;
a link mechanism connected to said movable transducer element and operating said movable transducer element among the first position where said movable transducer produces said first signal, second position where said movable transducer element produces said second signal and third position where said movable transducer element is maintained in an inoperative condition; and
a resilient means associated with said movable transducer element for resiliently biasing said movable transducer element towards said third position.

15. A detector as set forth in claim 14, wherein said movable transducer element is pivoted in said detector housing so that it can rotate thereabout among said first, second and said thrid positions corresponding to the relative position of the vehicle and said vehicle suspension member.

16. A detector as set forth in claim 14, wherein said stationary transducer element is an electromagnetic transducer and said movable transducer element includes magnets respectively having different poles, which magnets are positioned in a spaced apart relationship.

17. A vehicle level detector comprising:
a detector housing secured onto a vehicle body for motion therewith;
a stationary transducer element secured with said detector housing;
a movable transducer element disposed within said detector housing in an opposing relationship with respect to said stationary transducer element, said movable transducer element cooperatively producing a first signal indicative of the vehicle body elevation relative to a vehicle suspension member lowered across a first predetermined value and a second signal indicative of the vehicle body elevation relative to said vehicle suspension member raised across a second predetermined value;
a link mechanism connected to said movable transducer element and operating said movable transducer element among a first position where said transducer element produces said first signal, a second position where said transducer element produces said second signal, and a third position where said transducer elements are in an inoperative position; and
means for constantly biasing said movable transducer element towards said third position, said biasing means including a tension spring one end of which is connected with the detector housing and the other end of which is connected with said movable transducer element.

18. A vehicle level detector comprising:
a detector housing secured onto a vehicle body for motion therewith;
a stationary transducer element secured with said detector housing;
a movable transducer element disposed within said detector housing in an opposing relationship with respect to said stationary transducer element, said movable transducer element cooperatingly producing a first signal indicative of the vehicle body elevation relative to a vehicle suspension member lowered across a first predetermined value and a second signal indicative of the vehicle body elevation relative to said vehicle suspension member raised across a second predetermined value;

a link mechanism connected to said movable transducer element and operating said movable transducer element among a first position where said transducer element produces said first signal, a second position where said transducer element produces said second signal, and a third position where said transducer elements are in an inoperative position; and means for constantly biasing said movable transducer element towards said third position, said biasing means including a compression spring one end of which is connected with the detector housing and the other end of which is connected with said movable transducer element.

19. A vehicle level detector comprising:

a detector housing secured onto a vehicle body for motion therewith;

a stationary transducer element secured with said detector housing;

a movable transducer element disposed within said detector housing in an opposing relationship with respect to said stationary transducer element, said movable transducer element pivotable in said detector housing about a pivot among a first position when the vehicle body is lowered relative to a vehicle suspension member exceeding a first predetermined value, a second position when the vehicle body is raised relative to said vehicle suspension member exceeding a second predetermined value, and a third position wherein said relative positions of said vehicle body and said vehicle suspension member are maintained within a range between said first and second predetermined values, said movable transducer element cooperating with said stationary transducer element to produce a first signal when it is positioned at said first position and a second signal when it is positioned at said second position;

a link mechanism associated with said movable transducer element and operating said movable transducer element between said first, second and third positions; and a biasing means for constantly biasing said movable transducer element towards said third position, said biasing means including a tension spring one end of which is connected with said detector housing and the other end of which is connected with said movable transducer element.

20. A vehicle level detector comprising:

a detector housing secured onto a vehicle body for motion therewith;

a stationary transducer element secured with said detector housing;

a movable transducer element disposed within said detector housing in an opposing relationship with respect to said stationary transducer element, said movable transducer element pivotable in said detector housing about a pivot among a first position when a vehicle body is lowered relative to a vehicle suspension member exceeding a first predetermined value, a second position when the vehicle body is raised relative to said vehicle suspension member exceeding a second predetermined value, and a third position wherein said relative position of said vehicle body and said vehicle suspension member is maintained within a range between said first and second predetermined values, said movable transducer element cooperating with said stationary transducer element to produce a first signal when it is positioned at said first position and a second signal when it is positioned at said second position;

a link mechanism associated with said movable transducer element and operating said movable transducer element between said first, second and third positions; and a biasing means for constantly biasing said movable transducer element towards said third position, said biasing means including a compression spring one end of which is connected with said detector housing and the other end of which is connected with said movable transducer element.

* * * * *

UNITED STATES PATENT AND TRADEMARK OFFICE
CERTIFICATE OF CORRECTION

Figure 5:
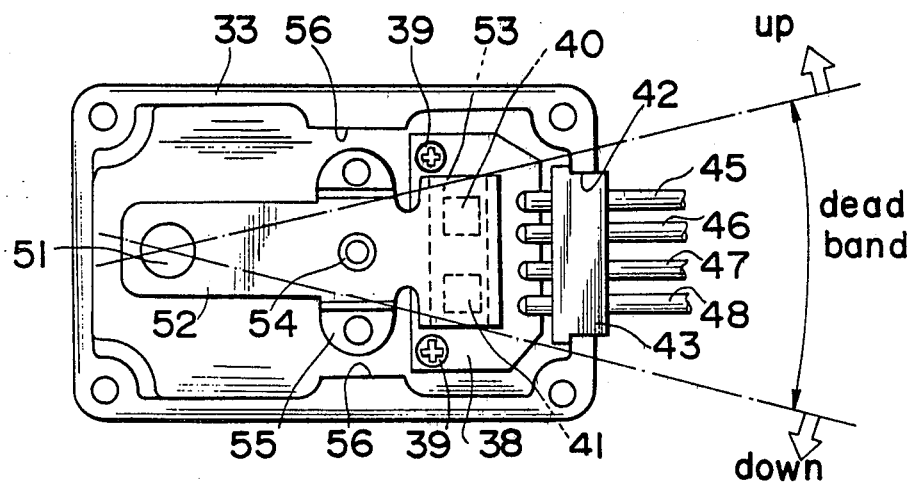
FIG. 5 is a view of the detector of FIG. 4, as viewed in a direction indicated by an arrow D.

PATENT NO. : 4,436,318
DATED : March 13, 1984
INVENTOR(S) : MAMORU ICHIKAWA ET AL It is certified that error appears in the above-identified patent and that said Letters Patent is hereby corrected as shown below:

In the drawings:

Fig. 5, "up" should read "down"; and "down" should read "up"; and

Figure 10:
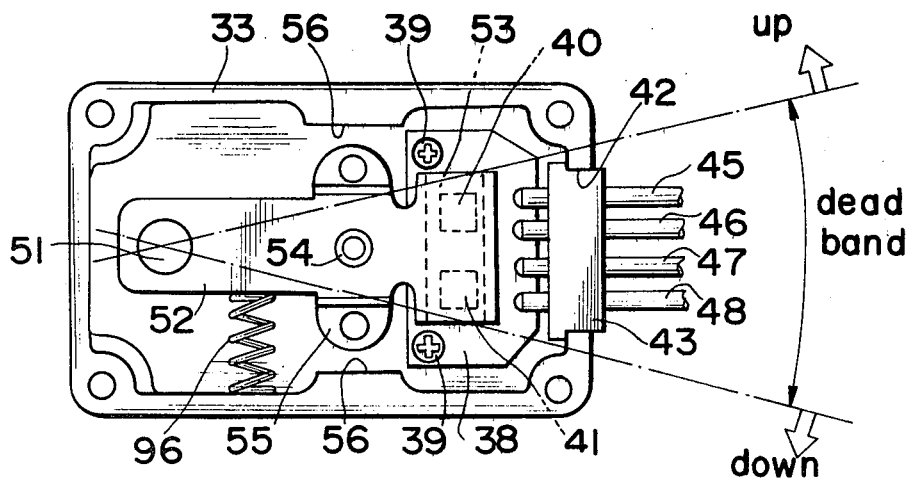
FIG. 10 is a similar view to FIG. 5 but showing another modification of the fail-safe mechanism in the vehicle level detector of the present invention.

Fig. 10, "up" should read "down"; and "down" should read "up".

Signed and Sealed this

Third Day of July 1984

[SEAL]

Attest:

GERALD J. MOSSINGHOFF

Attesting Officer   Commissioner of Patents and Trademarks